C. REISCH & G. KUHN.
GRINDING MACHINE.
APPLICATION FILED MAY 22, 1918.

1,292,372.

Patented Jan. 21, 1919.
7 SHEETS—SHEET 1.

INVENTORS:
Casper Reisch
George Kuhn
BY
ATTORNEYS

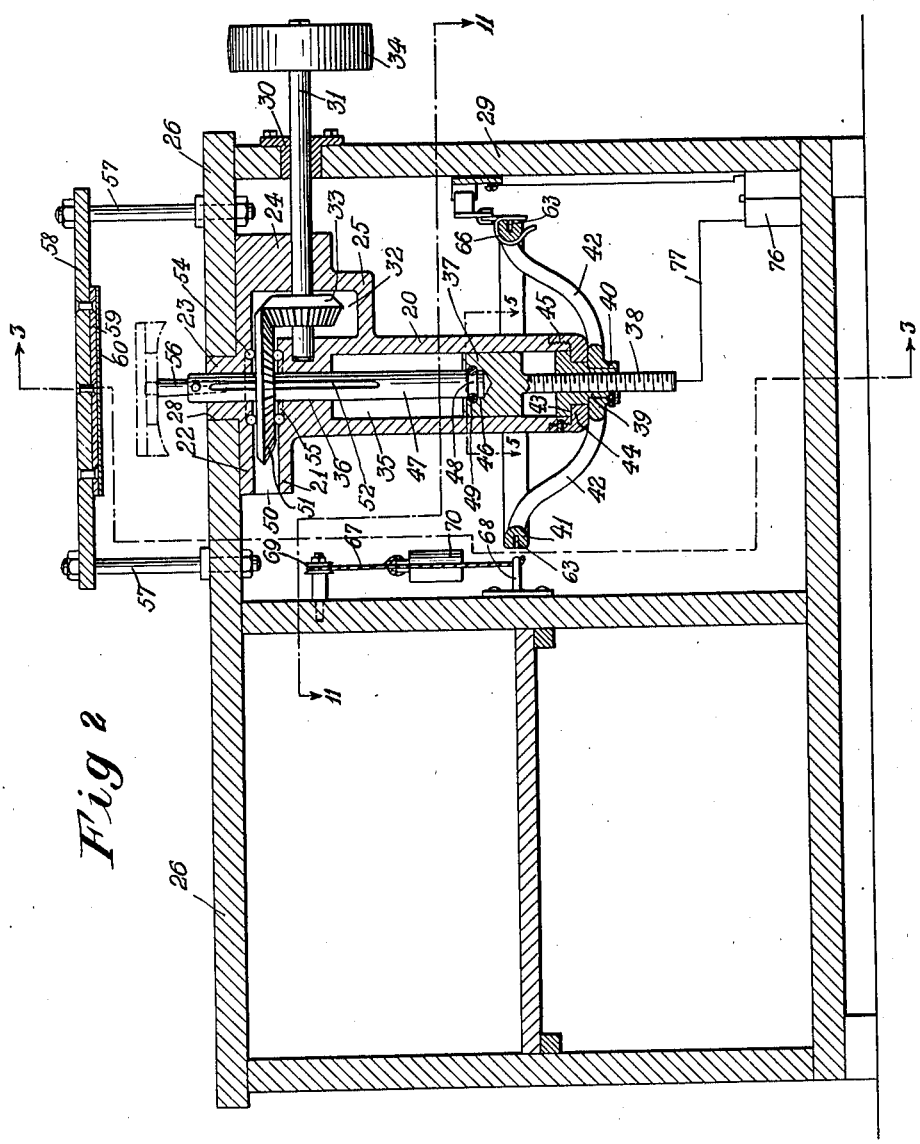

C. REISCH & G. KUHN.
GRINDING MACHINE.
APPLICATION FILED MAY 22, 1918.
1,292,372.
Patented Jan. 21, 1919.
7 SHEETS—SHEET 3.
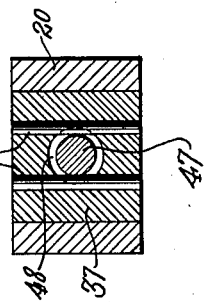
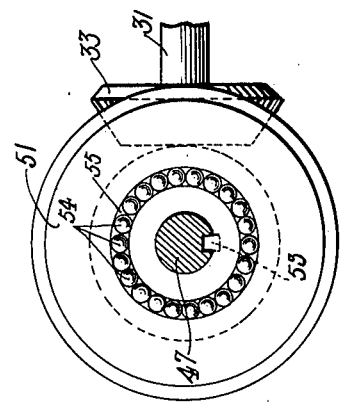
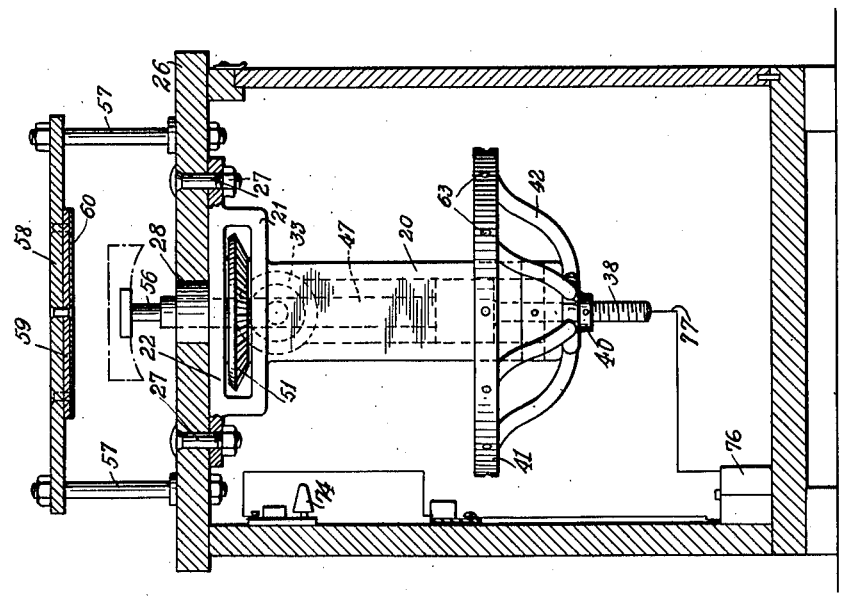
INVENTORS:
Casper Reisch
George Kuhn
BY
ATTORNEYS

C. REISCH & G. KUHN.
GRINDING MACHINE.
APPLICATION FILED MAY 22, 1918.

1,292,372.

Patented Jan. 21, 1919.
7 SHEETS—SHEET 4.

INVENTORS:
Casper Reisch
George Kuhn
BY
Alexander Turner
ATTORNEYS

C. REISCH & G. KUHN.
GRINDING MACHINE.
APPLICATION FILED MAY 22, 1918.

1,292,372.

Patented Jan. 21, 1919.
7 SHEETS—SHEET 5.

INVENTORS:
Casper Reisch
George Kuhn
BY
ATTORNEYS

C. REISCH & G. KUHN.
GRINDING MACHINE.
APPLICATION FILED MAY 22, 1918.
1,292,372.
Patented Jan. 21, 1919.
7 SHEETS—SHEET 6.
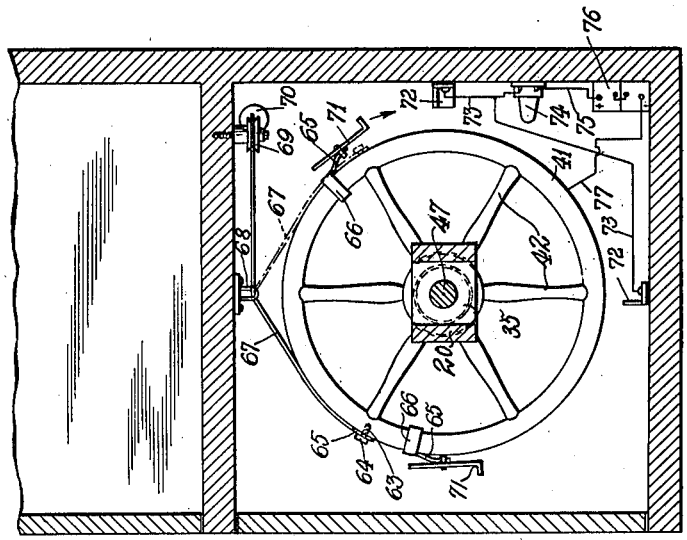
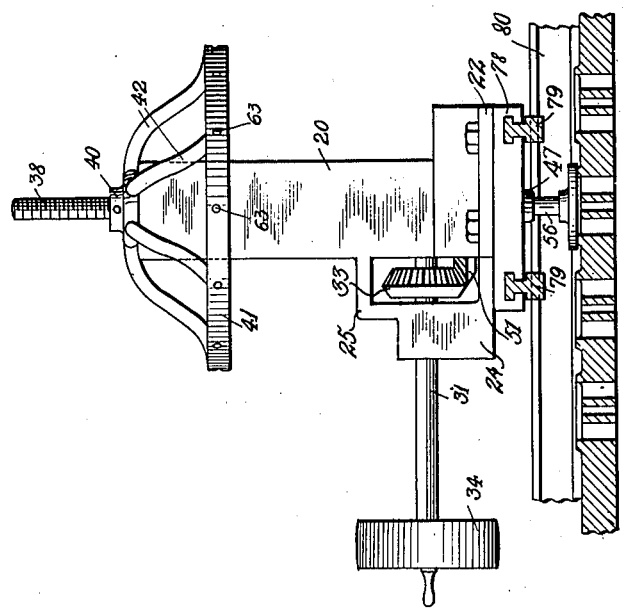
INVENTORS:
Casper Reisch
George Kuhn
BY
ATTORNEYS C. REISCH & G. KUHN.
GRINDING MACHINE.
APPLICATION FILED MAY 22, 1918.
1,292,372.
Patented Jan. 21, 1919.
7 SHEETS—SHEET 7.
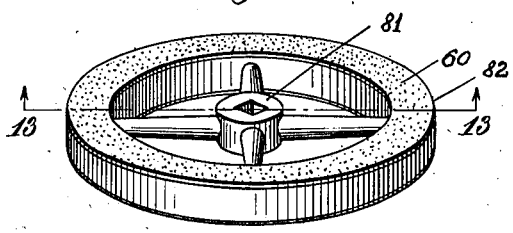
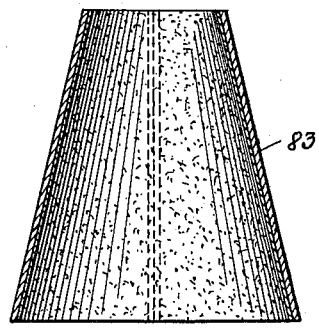
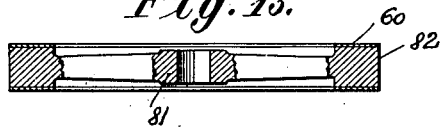
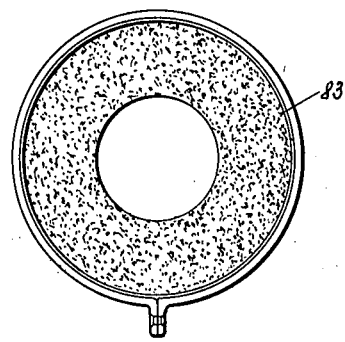
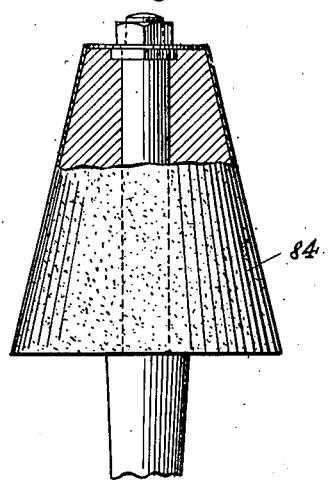
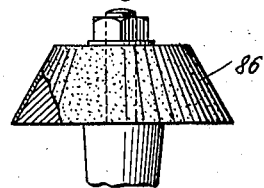
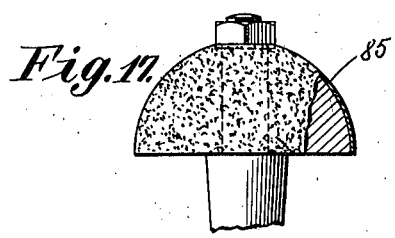
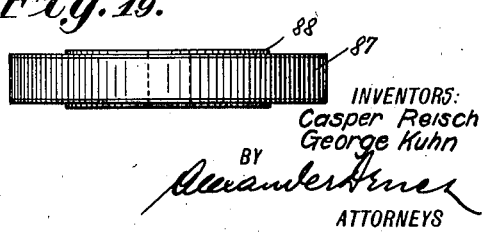
INVENTORS:
Casper Reisch
George Kuhn
BY
ATTORNEYS

UNITED STATES PATENT OFFICE.

CASPER REISCH, OF LINDEN, AND GEORGE KUHN, OF ELIZABETH, NEW JERSEY.

GRINDING-MACHINE.

1,292,372.

Specification of Letters Patent. Patented Jan. 21, 1919.

Application filed May 22, 1918. Serial No. 236,044.

*To all whom it may concern:*

Be it known that we, CASPER REISCH and GEORGE KUHN, both citizens of the United States, and residents, respectively, of Linden, in the county of Union and State of New Jersey, and Elizabeth, in the county of Union and State of New Jersey, have invented new and useful Improvements in Grinding-Machines, of which the following is a specification.

This invention relates to grinding machines, the invention being more particularly related to a machine for grinding valves and surfaces of various forms and sizes.

A principal object of the invention is the provision of a power driven valve grinding machine of simple, compact and comparatively inexpensive construction, capable of use in connection with a work-table for the grinding of relatively small devices and fittings, and adapted as well to be mounted for movement bodily so that it can be employed in operating upon relatively large castings or devices, which, for reasons of weight, size, or otherwise, cannot readily be removed to, or managed upon, the work-table.

Another object of the invention is the provision of a machine of this character capable of employing a variety of interchangeable holding and grinding heads, of which a choice may be made in order efficiently to operate upon surfaces of various sizes, forms, and types.

Another object of the invention is the provision in a machine of this character of impelling means whereby automatically to advance the operating shaft so that the proper frictional grinding engagement may be constantly effected even during the reduction of the surface subjected to the grinding action.

Another object of the invention is to equip a machine of this character with signaling means, adapted to give audible notice to the operator, when the impelling means should be reset.

With these and other objects in view, the invention resides in the details of construction and in the arrangement and combination of parts hereinafter described, defined in the claims, and illustrated in the accompanying drawings, forming a part of this specification; it being understood that changes and alterations in the precise embodiment of the invention herein disclosed may be made within the scope of what is claimed without departing from the spirit of the invention.

In the accompanying drawings:—Figure 1 is a view in perspective of the machine, showing the same employed in conjunction with a work-table.

Fig. 2 is a longitudinal sectional view, taken in the direction of the line 2—2 of Fig. 1.

Fig. 3 is a cross sectional view, taken in the direction of the line 3—3 of Fig. 2.

Fig. 4 is a horizontal sectional view, taken in the direction of the line 4—4 of Fig. 6.

Fig. 5 is a similar view, taken in the direction of the line 5—5 of Fig. 2.

Fig. 10 is a similar view, but taken in the direction of the line 10—10 of Fig. 8.

Fig. 11 is a horizontal section, taken in the direction of the line 11—11 of Fig. 2.

Figs. 12 and 13 are views illustrating in perspective and in section, respectively, a wheel type of grinding tool, designed especially for flat surface grinding.

Figs. 14 and 15 are views in section and in plan, illustrating a cone-shaped type of grinding tool, designed especially for exterior grinding.

Figs. 16, 17 and 18 are perspective views, partly in section, illustrating other types of grinding tools, the same being designed more particularly for interior grinding.

Fig. 19 is a side elevational view of another wheel type of grinding tool for surface grinding.

Figure 1:
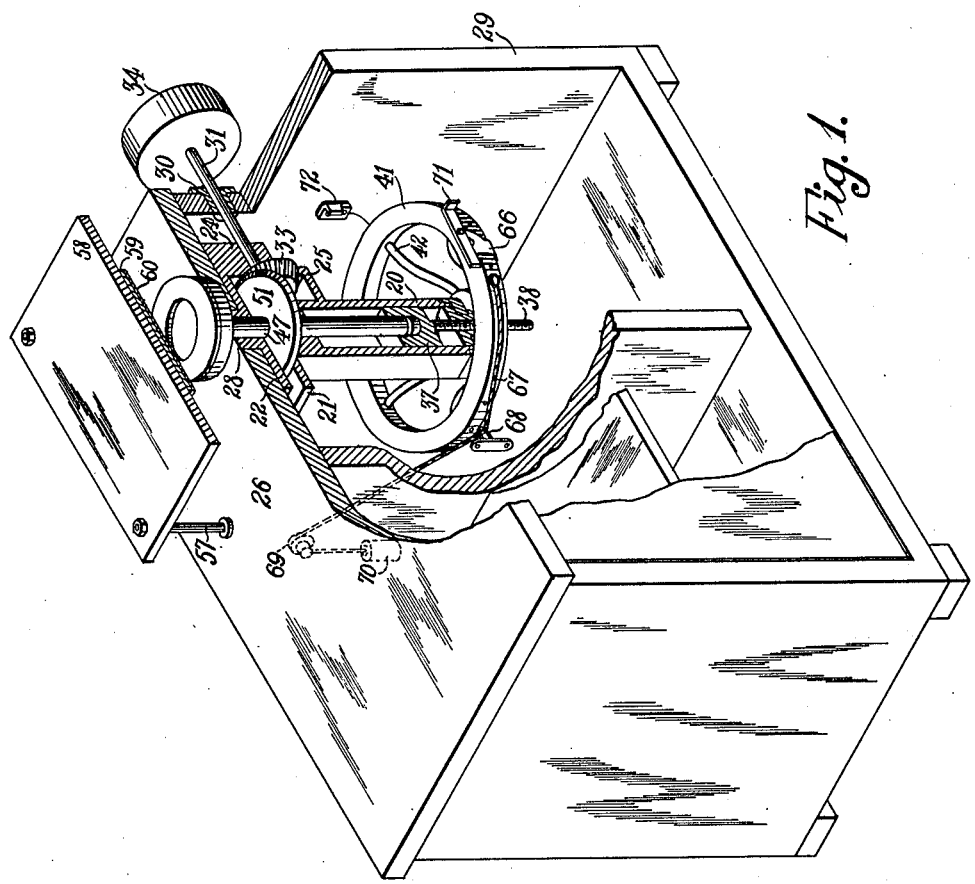

With more particular reference to the accompanying drawings, the holding-frame or casing for the working parts is made preferably as an integral element, including a vertical cylindrical portion 20, the offset upwardly projecting arms 21, and the horizontal plate 22 from which projects the vertical bearing portion 23. This plate 22 merges, at one end, into a vertical side bearing portion 24, extending downwardly spaced from the cylindrical portion 20, but connected therewith by the bracing arm 25.

In this particular form the holding-frame or casing is preferably made, that it may efficiently hold the assembled working parts in relatively small space, that it may be readily and removably secured to a suitable work-table as 26, and also that, upon removal, it may be transported bodily, and so mounted upon a carriage or frame arranged to travel across relatively large devices or structures, in which grinding operations are to be performed.

Thus, as best seen in Figs. 1, 2 and 3, the holding-frame may be detachably secured to the under-side of the work-table 26 by means of bolts and nuts as 27, the bearing 23 being engaged in a suitable opening 28 provided vertically through the said table.

Appropriately arranged in a standard as 29 of the work-table, or any suitable fixed support, is a bushing 30. Journaled in this bushing, in the bearing 24, and in the adjacent side of the cylindrical portion 20 is the driving shaft 31, which carries in the opening or slit 32 between the bearing 24 and the cylindrical portion 20, a bevel gear 33, and on its outer end a driving wheel 34, with which may be engaged the usual power driven belt.

The vertical cylindrical portion 20 below the journaling therein of the drive shaft 31, is provided longitudinally with a cavity 35, preferably of square form. At its upper end, this cavity communicates with a reduced round cavity 36, which extends upwardly through both the plate 22 and the bearing 23. Within the square cavity 35 is slidably fitted a head or block 37, with which is rigidly connected a stem portion 38. Upon this stem portion is threaded the hub 39 of the wheel 40, which is preferably made cup-shaped as shown so that the rim 41 thereof lies concentric around the cylindrical portion 20, it being noted in this connection that the spokes 42 of the wheel project from the lower portion of the hub, and that the hub is so constructed as to provide thereabove an annular recess 43 for the loose reception of the flanged end 44 of the collar or bearing member 45, which is threaded or otherwise removably secured upon the lower end of the cylindrical portion 20.

Rotatably extending through the round cavity 36 and also into an opening 46, which is provided in the head 37, is a shaft 47, the lower end of which within the said head 37 is provided with an annular groove or recess 48 for the reception of the pins 49, transversely arranged in the said head 37. The shaft 47 is thus mounted so that it will move in conjunction with the vertical movements of the head 37 and yet be free to have independent rotary movement with respect thereto.

Fast upon the shaft 47 in the opening 50 below the top plate 22, is a bevel gear 51 in mesh with the bevel gear 33. So that it may slide through the bevel gear 51 and yet rotate the same, the shaft 47 is provided with a longitudinal slot 52, in which is slidably engaged a lug 53 provided on the inner periphery of the hub of the said bevel gear (Fig. 4). By means of anti-friction rollers as 54 seated partly in annular grooves as 55 provided in its shouldered faces, and partly in other similar grooves cut in the confronting surfaces of the cylindrical portion 20, the bevel gear 51 is also operatively maintained in position. When the driving shaft 31 is operated, the vertical shaft 47 will be rotated in an obvious manner through the engaged gears 33 and 51, while the said shaft 47, whether at rest or during rotation, may be advanced or retracted vertically, accordingly as the adjusting wheel 40 is turned to the right or to the left.

Now in the upper end of the shaft 47, there is provided an opening of the form and size necessary to accommodate the standardized stems as 56 of the holding and grinding tools, which may be fashioned as desired or as may be necessary either to engage and carry the article to be ground, or to be fitted with a selected grinding head, types of which are illustrated in Figs. 12 to 19.

Figure 7:
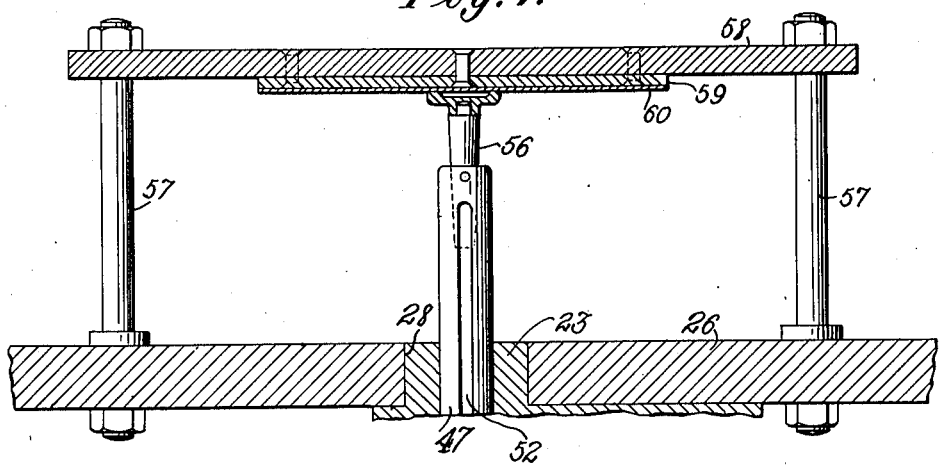
Fig. 7 is a similar view, but illustrating how the machine, when furnished with a holding tool, may be employed to rotate bodily against the grinding board, the part which is to be ground.

When the device to be ground is relatively small and of such character that it can be secured upon the end of a holding tool, we prefer to employ upon the work-table a framework consisting of upright posts as 57, arranged to support a horizontal holding board 58, upon the underneath side of which is secured a plate 59, to which may be glued, pasted or otherwise attached a sheet of emery paper as 60 or other suitable abrasive or grinding material. Having secured the article to be ground rigidly upon the holding tool, the adjusting wheel 40 is then turned so as to elevate the operating shaft 47 until the article to be ground is rotated against the abrasive as best indicated in Fig. 7, it being understood in this connection that accordingly as the adjusting wheel 40 is manipulated, the article to be ground will be rotated with weak or strong pressure against the abrasive.

Figure 6:
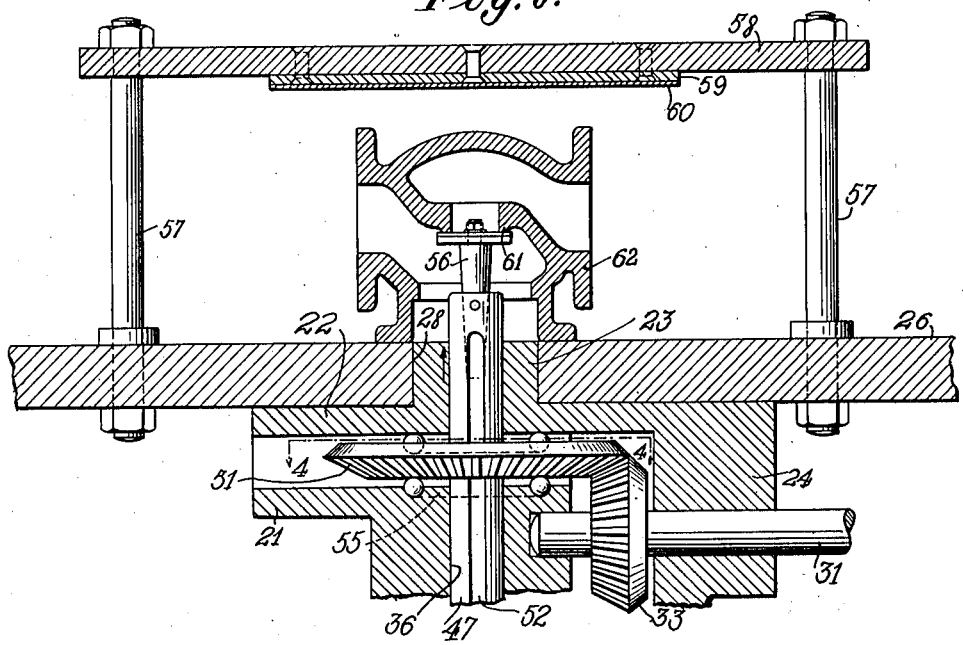
Fig. 6 is an enlarged fragmental sectional view, illustrating in particular how the machine, furnished with a grinding tool, may be employed to operate upon a valve seat.

Instead of securing the article to be ground upon the holding tool, a grinding tool may be attached to the standardized stem so as to be rotated against the article or part to be ground, which may be supported in proper position upon the work-table in any suitable manner. Thus in Fig. 6, we will illustrate how the grinding tool may be employed to operate upon the valve seat of a casting 62, supported upon the work-table.

The adjusting wheel 40 may be operated either manually or automatically. As a means of operating it automatically, we provide the rim 41 with spaced radial openings as 63, into a choice of which may be projected the end of a thumb screw 64, carried by the plate 65, projecting from the split band 66, which may be engaged upon the rim 41 in any position desired. Connected with this band 66 is a cord 67, to which, after passing through a supporting and guiding staple 68 and over a pulley 69, is attached a weight 70; and it should be noted here that the supporting and guiding staple 68 must be secured to a fixed frame element in such position with respect to the adjusting wheel that when the thumb screw is engaged in a rim hole on one side of the staple, the wheel will be turned in one direction toward the staple, and that, likewise, when it is engaged in a rim hole on the opposite side of the staple, the wheel will be drawn from the opposite direction toward the staple. Under this arrangement, the suspended weight 70 may be employed to constantly urge the turning of the adjusting wheel and consequently to maintain a tight frictional engagement between the abrasive and the article to be ground, even under the reduction or wearing away of the same.

Figure 9:
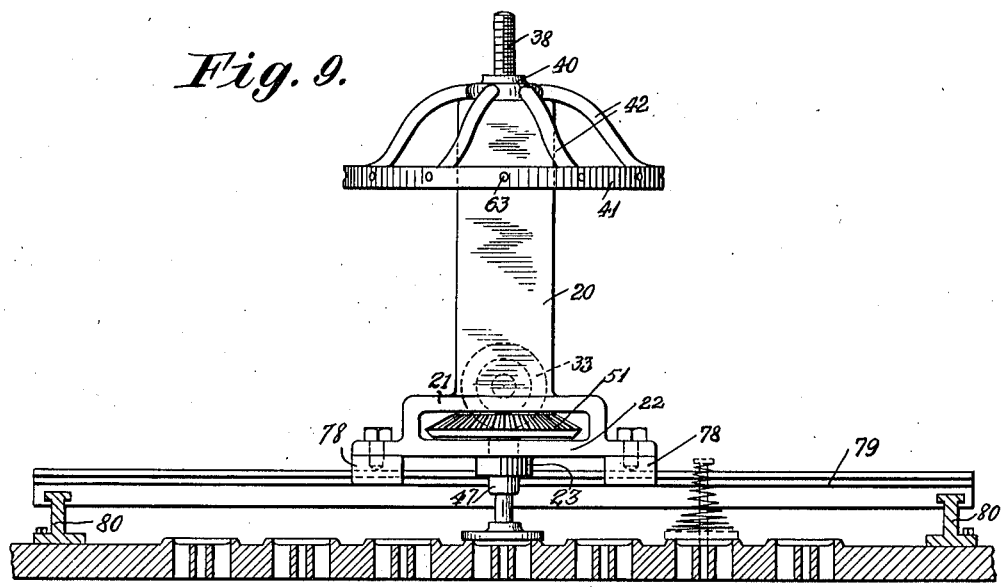
Fig. 9 is a vertical section, taken in the direction of the line 9—9 of Fig. 8.
Figure 8:
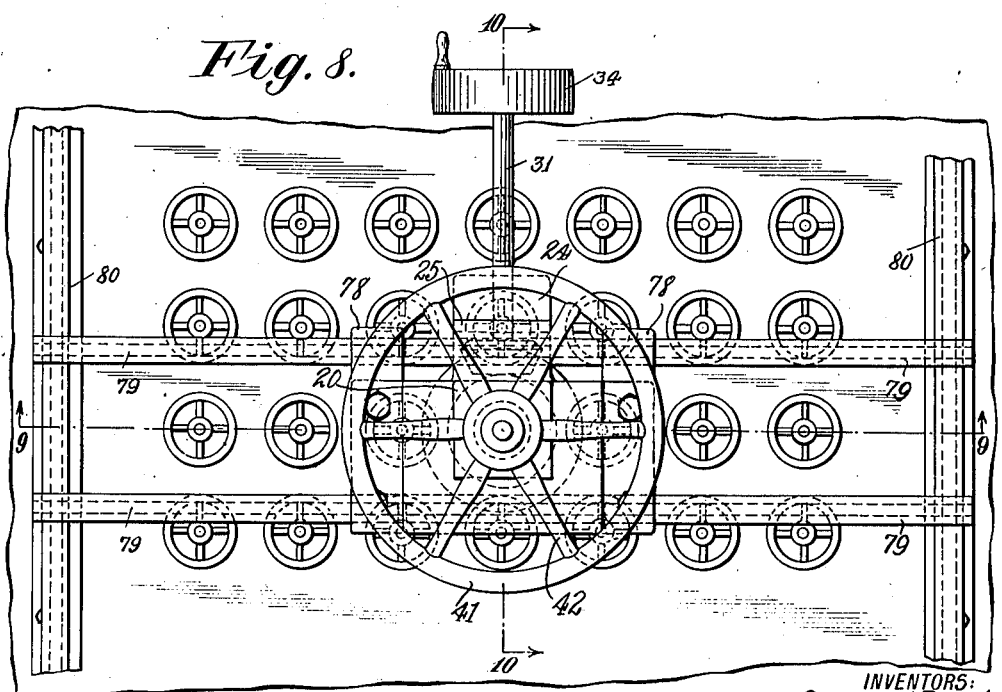
Fig. 8 is a fragmental top plan view, showing the machine mounted upon a track for bodily movement in order to operate upon relatively large or heavy devices.

In order that the workman may give attention to other duties while one of these machines is operating, we provide means whereby an audible signal will be given whenever the adjusting wheel has been drawn into such position that there is no longer effective frictional contact between the abrasive and the article to be ground. Thus, in Fig. 11, we show a metal angular contact plate 71 secured by the thumb screw 64 upon the band projection 65. When the wheel is turned sufficiently, this contact plate impinges a fixed contact plate 72, which is connected by an electrical wire 73 with an electrically operated alarm bell 74. Another wire 75 connects this bell with the positive side of the battery 76; and still another wire 77 connecting the negative side of the battery with the wheel rim 41, through which rim, the metal band 66 and the projection 65 the negative return is effected, although it may be effected in any other suitable manner, so that each time the contact 71 engages the contact 72 an electric circuit will be closed, sounding the bell 74, and thereby notifying the workman that the adjusting wheel should be reset by raising the weight and inserting the thumb screw in a more distant radial opening.

Where valves or surfaces are to be ground in large and heavy structures, such as pumps for instance, my improved valve grinding machine may be detached from the work-table and mounted bodily movable over the structure in which the work is to be done. Thus, in Figs. 8, 9 and 10, we show the machine mounted in inverted position upon a carriage to operate upon the valves of a heavy structure. Here it will be seen that the horizontal plate 22 is secured to a bed plate 78, which is slidably mounted upon a pair of parallel rails 79. These rails are in turn slidably mounted upon a pair of cross parallel rails 80, which may be supported in any suitable manner upon any suitable frame-work, all in such manner that the machine may be moved bodily either longitudinally or transversely of the structure to be operated upon.

In Figs. 12 to 19 inclusively, there are illustrated various types of grinding tools some of which are formed so as to be fitted to the standardized stems 56 and others of which are themselves provided with standardized stems for engagement directly with the rotatable shaft 47. Thus in Figs. 12 and 13, we show a grinding tool 81 formed like a wheel and adapted to be secured upon the standardized stem. Upon the face of the rim 82 of the wheel, is secured the emery or abrasive 60 for surface grinding. Figs. 14 and 15 show a cone-shaped grinding tool 83 for exterior grinding, the inner periphery of the tool being provided with the abrasive. Fig. 16 shows a cone-shaped tool 84, the outer periphery of which is provided with the emery for interior grinding. Fig. 17 illustrates a semi-spherical tool 85 for interior grinding. Fig. 18 illustrates another type of cone-shaped tool 86 for interior grinding; while Fig. 19 illustrates another type of wheel-shaped tool 87 for surface grinding, this tool being provided with a concentric plate 88 of smaller diameter, to which the abrasive is secured.

Having thus described our invention, what we claim is:—

1. In a machine of the class described, the combination with a holding frame including an elongated body section, of an operating shaft arranged within the body section and extending one end beyond the same, means for imparting rotary motion to said operating shaft, means for actuating said shaft longitudinally, said last means including an adjusting wheel, and means adapted to operate upon said adjusting wheel to effect automatic adjustment.

2. In a machine of the class described, the combination with a holding-frame having an elongated body section, of an operating shaft working therein and projecting from one end of said frame, means for rotating said shaft, means for actuating said shaft longitudinally, said last means including an adjusting wheel, means adapted to operate upon said wheel to automatically control the same, and means whereby to give warning when the limit of adjustment is attained.

3. In a machine of the class described, the combination with a holding-frame having an elongated body section, of an operating shaft arranged in said section and projecting one end beyond the same, means for rotating said shaft, a head slidably arranged in said body section with which head the operating shaft is rotatably connected, a stem combined with said head and extending beyond the opposite end of said body section, an adjusting wheel arranged on said stem and adapted to actuate the same longitudinally, and means adapted automatically to control said adjusting wheel.

4. The combination of a movably mounted element, a holding-frame detachably secured thereto and provided with an elongated body section, an operating shaft arranged in said body section and adapted to project one end beyond said movable element, means for rotating said shaft, means for actuating said shaft longitudinally, said last means including an adjusting wheel, and means for automatically controlling the adjustment of said wheel within fixed limits.

5. In a machine of the class described, the combination of a supported plate of abrasive material, means for rotating and pressing thereagainst an article to be ground, said means including a tool for holding the article to be ground, a shaft for holding the tool, means for rotating said shaft, and means for imparting longitudinal movement to said shaft.

In testimony whereof we have signed our names to this specification.

CASPER REISCH.
GEORGE KUHN.